US010656402B2

(12) United States Patent
Ghetler et al.

(10) Patent No.: US 10,656,402 B2
(45) Date of Patent: May 19, 2020

(54) THREE-DIMENSIONAL INFRARED IMAGING OF SURFACES UTILIZING LASER DISPLACEMENT SENSORS

(71) Applicant: Agilent Technologies, Inc., Santa Clara, CA (US)

(72) Inventors: Andrew Ghetler, San Jose, CA (US); Richard P. Tella, Sunnyvale, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 723 days.

(21) Appl. No.: 15/418,612

(22) Filed: Jan. 27, 2017

(65) Prior Publication Data

US 2019/0004300 A1    Jan. 3, 2019

(51) Int. Cl.
*G02B 21/00* (2006.01)
*G02B 21/06* (2006.01)

(52) U.S. Cl.
CPC ....... *G02B 21/0048* (2013.01); *G02B 21/006* (2013.01); *G02B 21/06* (2013.01)

(58) Field of Classification Search
CPC .. G02B 21/0048; G02B 21/006; G02B 21/06; G02B 21/002; G01Q 60/18

USPC ......................................... 359/368, 381, 383
See application file for complete search history.

(56) References Cited

U.S. PATENT DOCUMENTS

| | | | |
|---|---|---|---|
| 2006/0072191 A1* | 4/2006 | Akiyama | G02B 21/0032 359/385 |
| 2011/0101203 A1* | 5/2011 | Cooper | G02B 21/245 250/201.4 |
| 2015/0226670 A1* | 8/2015 | Kleppe | G02B 21/06 359/385 |

* cited by examiner

*Primary Examiner* — Kristina M Deherrera

(57) ABSTRACT

A scanning apparatus having a stage adapted to hold a specimen to be imaged and to move the specimen in a first direction, and a light source that includes a tunable laser that generates a light beam having an illumination wavelength that varies as a function of an input signal is disclosed. The apparatus includes an imaging system having a scanning assembly that includes a focusing lens that focuses the light beam to a measurement point on the specimen, a first mirror that moves in a second direction relative to the stage such that the focusing lens maintains a fixed distance between the focusing lens and the stage, and a displacement sensor that measures a distance between the scanning assembly at a mapping point on the specimen, and a light detector that measures an intensity of light leaving the measurement point on the specimen.

9 Claims, 5 Drawing Sheets

THREE-DIMENSIONAL INFRARED IMAGING OF SURFACES UTILIZING LASER DISPLACEMENT SENSORS

BACKGROUND

Quantum cascade lasers provide a tunable mid-infrared (MIR) light source that can be used for spectroscopic measurements and images. Many chemical components of interest have molecular vibrations that are excited in the MIR region of the optical spectrum, which spans wavelengths between 5 to 25 microns. Hence, measuring the absorption of MIR light at various locations on a sample can provide useful information about the chemistry of the sample as a function of position on the sample. Samples that are not flat and parallel to the imaging plane present challenges. In particular, parts of the sample will be out of focus which limits the resolution of the image in areas that are not in focus.

SUMMARY

The present invention includes a scanning apparatus having a stage adapted to hold a specimen to be imaged and to move the specimen in a first direction, and a light source that includes a tunable laser that generates a light beam having an illumination wavelength that varies as a function of an input signal. The apparatus also includes an imaging system that includes a scanning assembly which includes a focusing lens that focuses the light beam to a measurement point on the specimen, a first mirror that moves in a second direction relative to the stage such that the focusing lens maintains a fixed distance between the focusing lens and the stage, the second direction is different from the first direction, and a displacement sensor that measures a distance between the scanning assembly at a mapping point on the specimen, and a light detector that measures an intensity of light leaving the measurement point on the specimen.

In one aspect of the invention, the displacement sensor does not move with the scanning assembly. The scanning assembly includes a second mirror that moves with the scanning assembly, the second mirror reflecting a light beam from the displacement sensor onto the specimen and directing light reflected from the specimen into the displacement sensor.

In another aspect of the invention, the focusing lens is characterized by an in-focus distance, and the apparatus includes a controller that determines whether the measurement point on a surface of the specimen currently positioned to be measured by the light detector is in focus, the controller causing the light detector to measure the intensity of light leaving the point and records the measured intensity value if the measurement point was in focus.

In another aspect of the invention, the controller alters the in-focus distance to cause a measurement point on the specimen that was not in focus, to become in focus and then measure the light intensity of light leaving the measurement point on the specimen. In another aspect of the invention, the focusing lens is characterized by a focal length and wherein the controller alters the focal length to change the in-focus distance. Alternatively, the controller changes a distance between the focusing lens and the specimen to change the in-focus distance.

In another aspect of the invention, the controller causes the scanning assembly to scan the specimen in a raster scanning mode in which the scanning assembly executes scan lines in the second direction followed by changes in the stage position before or after a scan line is executed, and the controller does not alter the in-focus distance during a scan line.

In another aspect of the invention, the measurement point is displaced relative to the mapping point such that a distance between the scanning assembly and the measurement point is available to the controller prior to the measurement point being positioned for measurement by the detector. For example, the mapping point can be on a separate scan line from the measurement point.

DETAILED DESCRIPTION

Figure 1:
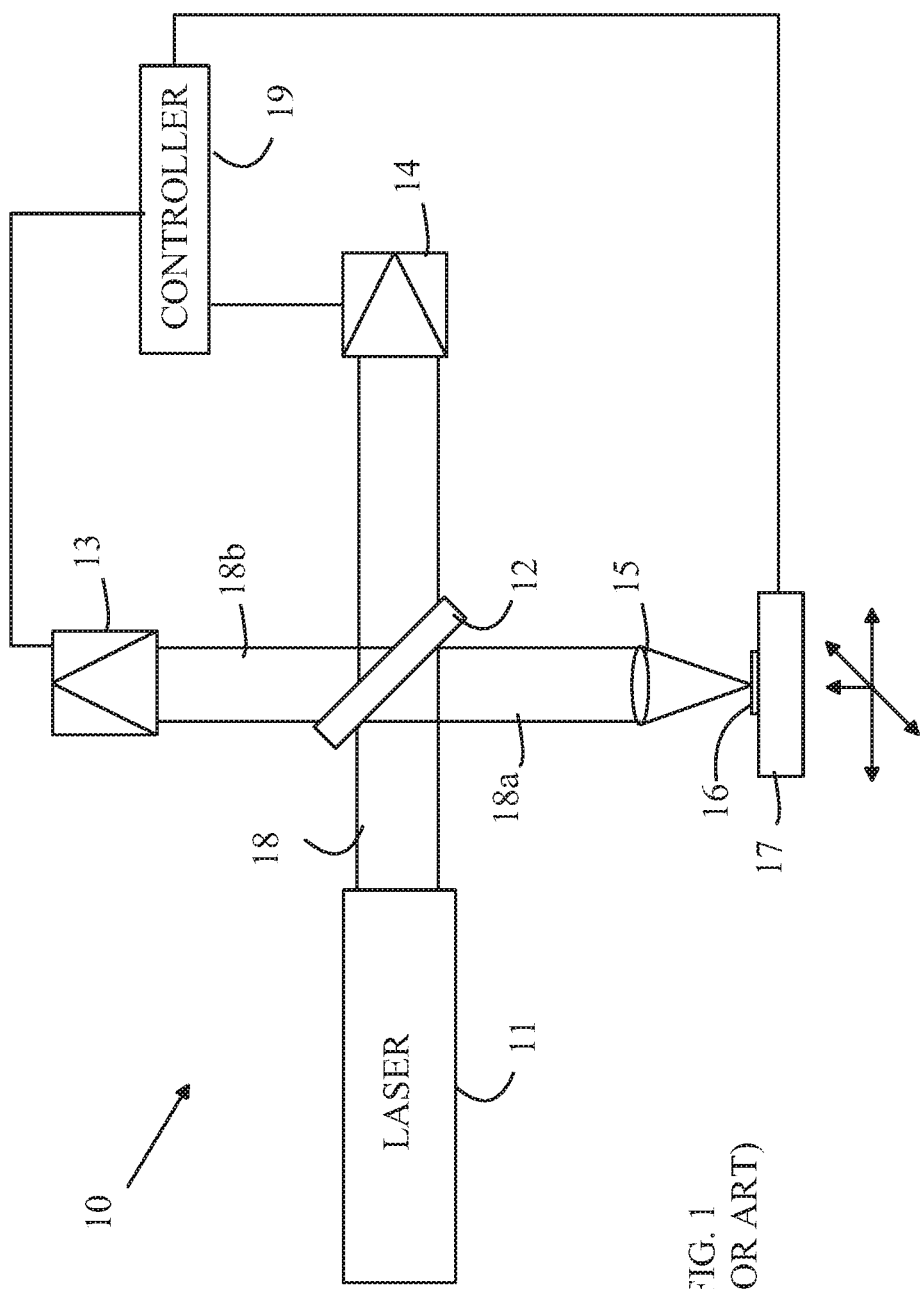
FIG. 1 illustrates the image generating methodology for a raster scanned MIR imaging system.

Refer now to FIG. 1 which illustrates the image generating methodology for a raster scanned MIR imaging system. Imaging system 10 includes a quantum cascade laser 11 that generates a collimated light beam 18 having a narrow band of wavelengths in the MIR. In one aspect of the invention, quantum cascade laser 11 is a quantum cascade laser having a tunable wavelength that is under the control of a controller 19. Collimated light beam 18 is split into two beams by a partially reflecting mirror 12. Light beam 18a is directed to a lens 15 that focuses that beam onto a specimen 16 that is mounted on xyz-stage 17 that can position specimen 16 relative to the focal point of lens 15. Light that is reflected back from specimen 16 is collimated into a second beam that has a diameter determined by the aperture of lens 15 and returns to partially reflecting mirror 12 along the same path as light beam 18a. While the first and second beams are shown as having the same cross-section in FIG. 1, it is to be understood that the second beam could have a different cross-section than the first beam. A portion of the second beam is transmitted through partially reflecting mirror 12 and impinges on a first light detector 13 as shown at 18b. Light detector 13 generates a signal related to the intensity of light in beam 18b. Controller 19 computes an image as a function of position on specimen 16 by moving specimen 16 relative to the focal point of lens 15 using some form of xyz-stage 17. A detector 14 measures the intensity of the light from the laser to provide a means for correcting for fluctuations in the laser output.

In the above described system, the stage moves the sample in two dimensions during the generation of an image. However, the stage has a significant mass, and hence, the speed at which the sample is imaged is limited by the motion of the stage. In embodiments in which rapid imaging time is important, embodiments in which the specimen is scanned in one direction by moving lens 15 are preferred.

Figure 2:
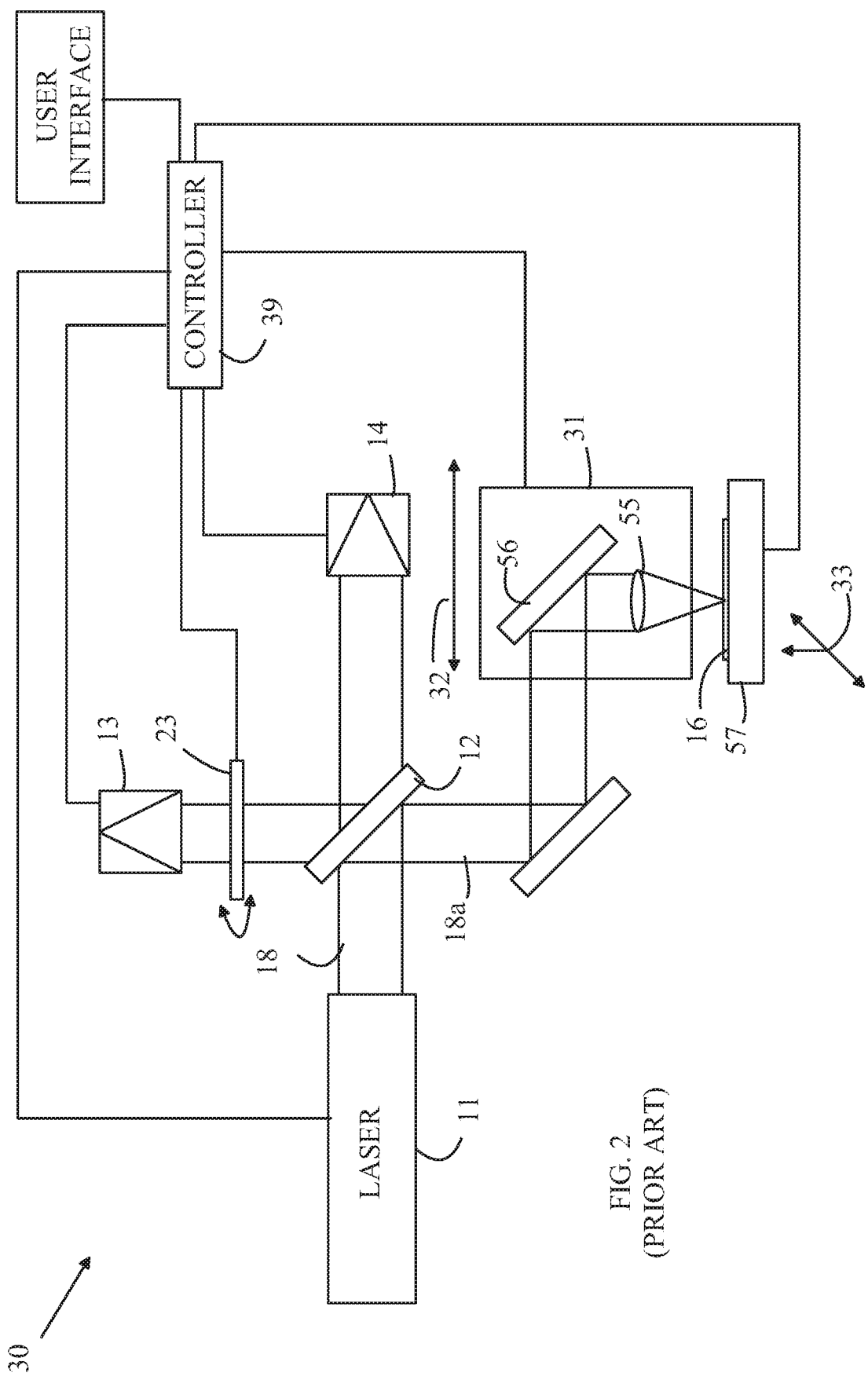
FIG. 2 illustrates an embodiment of an imaging system that addresses the slow scan rates encountered with the embodiment shown in FIG. 1.

Refer now to FIG. 2, which illustrates an embodiment of an imaging system that addresses the slow scan rates encountered with the embodiment shown in FIG. 1. In imaging system 30, the stage assembly is divided into two components. Component 31 includes focusing lens 55 and is moveable in a direction shown at 32 such that a single line of the image is generated with each pass of component 31. Direction 32 will be referred to as the "fast axis" in the following discussion. Since focusing lens 55 and mirror 56 have a mass that is small compared to component 57, component 31 can be moved with much greater speed. For example, component 31 can be mounted on a rail and moved in a manner analogous to a print head on an inkjet printer. The second component of the stage assembly is shown at 57. Component 57 includes the mounting mechanism for the specimen being scanned and moves in a direction 33 that is orthogonal to direction 32. Since component 57 only needs to move once per scan line, the slower speed of motion associated with the more massive component 57 is acceptable. Controller 39 controls the wavelength of quantum cascade laser 11, the axis of linear polarization filter 23, and the position of component 31.

The numerical aperture of focusing lens 55 is typically very large, and hence, the depth of focus is very limited. Accordingly, with non-flat samples or planar samples whose surfaces are not parallel to the xy plane, portions of the image will be out of focus. In principle, the imaging system could be refocused at each point prior to making the absorption measurements as a function of wavelength of the incident light. However, the time to correct the z-setting of the sample at each point is prohibitive. Furthermore, in embodiments such as shown in FIG. 2, stopping the motion of component 31 defeats the advantage of this arrangement.

The present invention overcomes this problem by providing a displacement sensor that maps the surface topology of the specimen ahead of the infrared imaging system encountering each surface point. This allows the focal distance to be altered such that the infrared beam is focused at the desired point on the specimen. For the purposes of the present discussion, a displacement sensor is defined to be a device that emits a light beam that is reflected by the surface being measured and determines the distance from the displacement sensor to the surface from the light distribution of the reflected light. Displacement sensors based on lasers and imaging arrays are commercially available. A laser displacement sensor includes a laser diode that directs a spot of light onto the surface being measured. Light returning from the surface at an angle to the incident beam is imaged onto a position sensitive optical element such as CMOS or CCD photodiode array. The location of the reflected light on the array determines the distance from the laser displacement sensor to the sample. The uncertainty in the distance measurement provided by the displacement sensor is preferably less than the depth of field of lens 55 to enable the vertical mappings provided by the displacement sensor to be used in setting the vertical position of lens 55 such that the sample remains in focus when the surface of the sample varies vertically.

Figure 3:
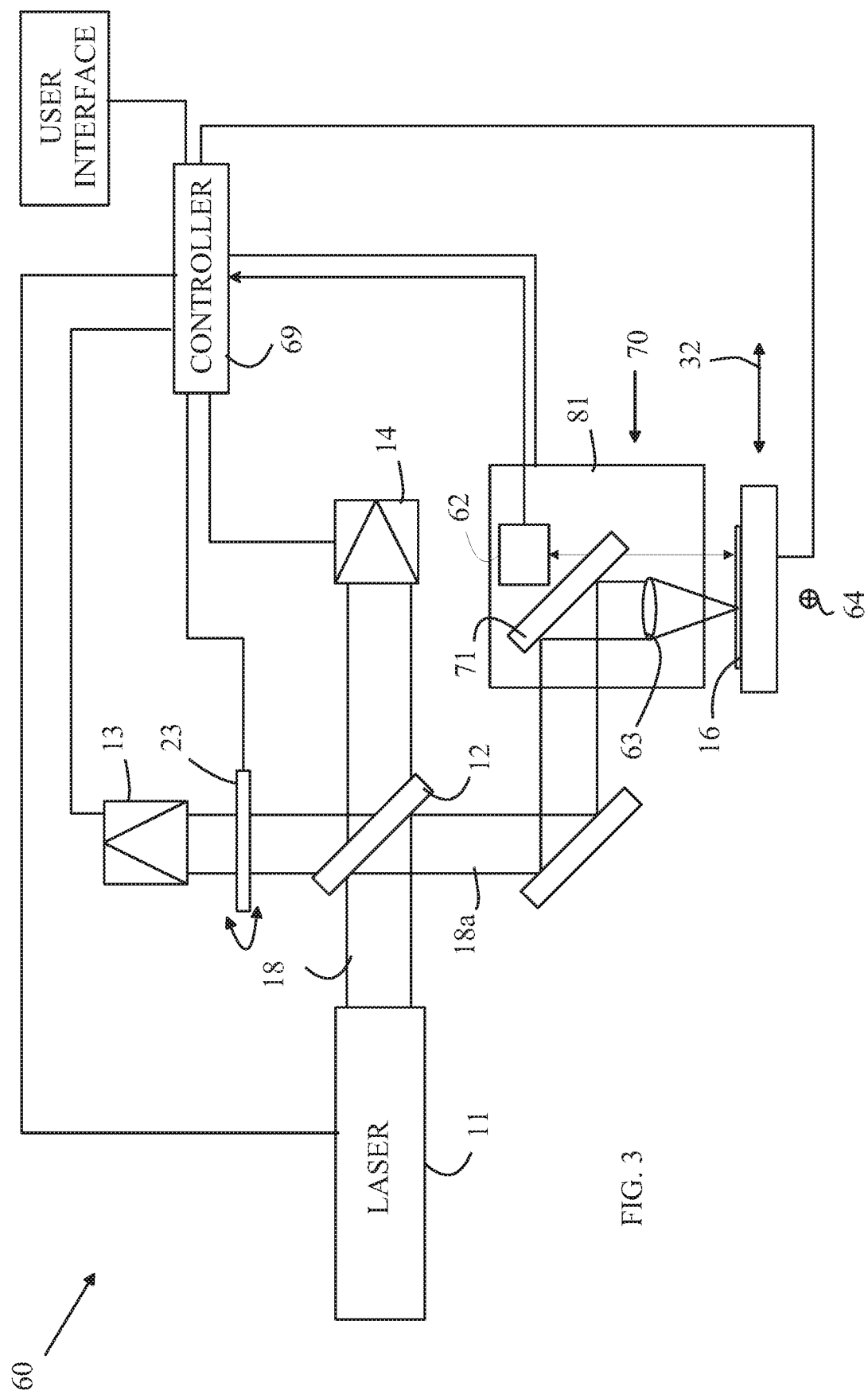
FIG. 3 is a schematic drawing of an imaging system according to one embodiment of the present invention.
Figure 4:
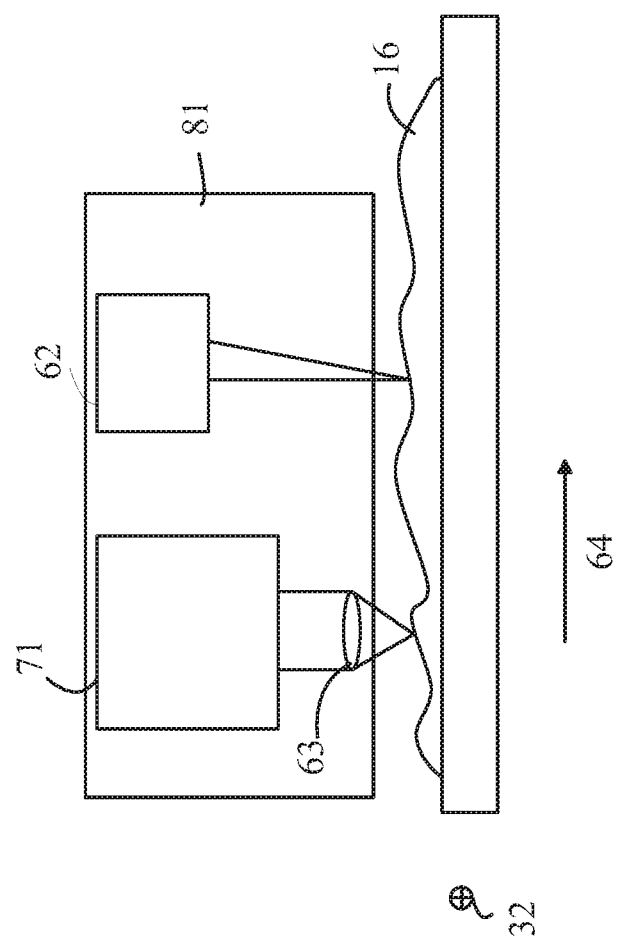
FIG. 4 is a side view of scanning head 81 as seen from 70.

Refer now to FIGS. 3 and 4, which illustrate an infrared imaging system according to one embodiment of the present invention. FIG. 3 is a schematic drawing of imaging system 60, and FIG. 4 is a side view of scanning head 81 as seen from 70. To simplify the following discussion, those elements of imaging system 60 that serve functions analogous to elements discussed above with reference to imaging system 30 shown in FIG. 2 have been given the same numeric designation and will not be discussed further here unless the context requires such a discussion. Scanning head 81 moves in the fast direction and includes two imaging sub-sections. The first imaging sub-section is an infrared imaging optical arrangement comprising mirror 71 and optical system 63 which serves a function analogous to lens 55 shown in FIG. 2. Optical system 63 can be a single lens or a variable focal length lens system that is under the control of controller 69. Scanning head 81 also includes a laser displacement sensor 62 that measures the distance to the top surface of specimen 16 at a point that is displaced from the focal point of optical system 63.

Figure 5:
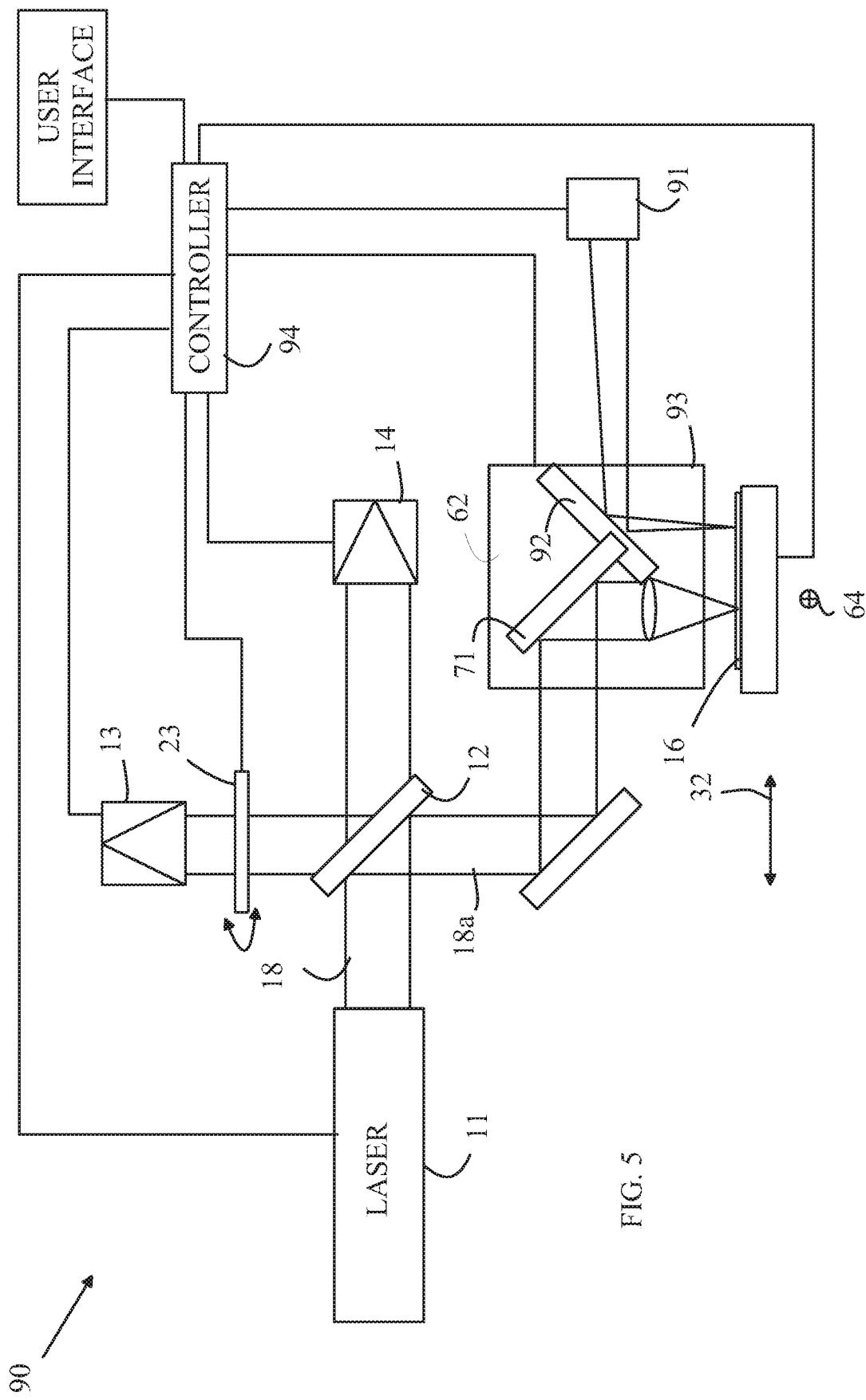
FIG. 5 illustrates another embodiment of an imaging system according to the present invention.

In the above described embodiments, the displacement sensor is mounted on scanning head 81. As discussed above, reducing the mass of the scanning head allows for faster scanning. Hence, reducing the added mass and size of the displacement sensor component that is mounted on the scanning head can provide significant improvements in the scanning speed. Refer now to FIG. 5, which illustrates another embodiment of an imaging system according to the present invention. To simplify the following discussion, those components of imaging system 90 that serve functions analogous to components in imaging system 60 have been given the same numeric designations and will not be discussed further unless the context requires that discussion. In imaging system 90, displacement sensor 91 has been moved to a fixed location. A mirror 92 is mounted on scanning head 93 and redirects the laser beam from displacement sensor 91 to specimen 16. The light reflected from specimen 16 is likewise reflected from mirror 92 back to displacement sensor 91. In this arrangement, the measured distance between displacement sensor 91 and specimen 16 changes with both the position of scanning head 93 and the vertical height of specimen 16. Since controller 94 "knows" the position of scanning head 93 along the fast axis, controller 94 can correct for the variation introduced by the change in distance along the fast axis.

Scanning head 93 has a mass that differs from component 31 in imaging system 30 shown in FIG. 2 by the mass of mirror 92, and hence, provides a significant savings in mass relative to scanning head 81 shown in FIG. 3. The cost of this improvement is the additional cost of having a displacement sensor that operates over an apparent vertical distance of the order of the scanning distance on the specimen in the fast axis direction.

In one aspect of the present invention, laser displacement sensor 62 is displaced from optical system 63 and measures points on specimen 16 prior to those points being positioned under optical system 63. For the purpose of this discussion, a line scanned in the fast direction will be referred to as a scan line. The entire image is a collection of parallel scan lines. Any given scan line can be denoted by a line number indicating the position of that line in the slow axis direction. As the image is generated, scan lines are generated in the order of the scan lines associated with those lines. In this aspect of the present invention, laser displacement sensor 62 is positioned over a scan line having a line number that is greater than that of the scan line currently being scanned.

Hence, controller 69 will have a measurement of the distance between optical system 63 and the surface of the sample at the current location of optical system 63 over the currently being scanned scan line. Given that information, controller 69 can execute one of a number strategies to improve the IR image of the sample. In the following discussion, an IR measurement made when light beam 18a is focused to a point on the specimen surface will be referred to as an in-focus measurement. In general, optical system 63 is characterized by a depth of focus. If the point of focus on the specimen is within that depth of focus, the resulting measurement will also be defined to be an in-focus measurement. Similarly, a measurement that is not an in-focus measurement will be referred to as an out-of-focus measurement. Given a measurement of the location of the top of the sample at any given point and a knowledge of the focal length of optical system 63, controller 69 can determine if the resulting measurements at that point are in focus.

If a point is out of focus, the focal point of optical system 63 relative to the top of the sample surface can be adjusted to bring that point back into focus. An axis that is orthogonal to both the slow and fast axes will be referred to as the z-axis in the following discussion. This can be accomplished by changing the physical distance in the z direction between optical system 63 and the sample surface or by changing the focal length of optical system 63. The distance can be changed by moving the stage relative to optical system 63. However, the time to make such a movement can be prohibitive as that movement requires that objects having a mass much greater than the scan head be moved, and hence, this strategy is preferred in cases in which the vertical separation is at least constant over the entire scan line. Alternatively, the focal length of optical system 63 can be altered to move the focal point of optical system 63 relative to the surface of the sample. Piezoelectric drive mechanisms capable of moving the focal length at speeds consistent with speed of travel in the fast axis can be utilized in cases in which all of the points on a given scan line are to be measured in a single pass.

If a point is out of focus when scanning head 81 is positioned to make an IR measurement at that point, the z distance between the sample and the focal point of optical system 63 can be moved on a point-by-point basis along the scan line or the point can merely be marked as out of focus. In the later case, the scan line can be repeated with a new focal distance that is chosen such that as many of the out-of-focus points on the scan line can be re-measured in focus. This process can be repeated at different focal distances until all of the points of interest on the sample have in-focus measurements. The sample can then be advanced in the slow direction.

In one aspect, controller 69 includes a memory in which one or more IR measurements are stored for each point in the sample. In addition, controller 69 stores a surface map of the sample, for each point on the sample. This surface map also includes a flag indicating that the point in question has been measured when that point was in focus. It is convenient to define a conventional (x,y,z) coordinate system for referencing points on the sample. Here, x will be defined to be along the fast axis (i.e., direction 32), and y will be defined to be along the slow axis (i.e., direction 64). When the scan head is over any given (x,y) point on the sample, the controller will be able to determine the height of the sample at that point from data provided by the laser displacement sensor on a previous scan line. If controller 69 determines that a point is out of focus on the current scan line and has not been previously measured at a z-setting that was in focus, controller 69 sets the flag to indicate that the point requires re-measurement with a new z-value. At the end of the current scan, the controller can determine a new vertical focus point relative to the surface of the sample at which all or a portion of the sample is to be measured with the new data replacing the old out-of-focus data at the points that are in focus at the new vertical focus. This process can be iterated until all of the points on the current scan line have in-focus measurements.

The topological data from the displacement sensor can also be used in displaying the results of the IR measurements. In one aspect of the invention, the controller displays a three-dimensional image of the surface of the specimen with the IR data superimposed on the topological data.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. An apparatus comprising:
a stage adapted to hold a specimen to be imaged and to move said specimen in a first direction, said stage being characterized by a stage position in said first direction;
a light source comprising a tunable laser that generates a light beam having an illumination wavelength that varies as a function of an input signal;
an imaging system comprising a scanning assembly that moves over said stage in a second direction that is different from said first direction, said scanning assembly comprising a first mirror and a focusing lens fixed relative to one another such that said focusing lens focuses said light beam to a point on said specimen that moves with said scanning assembly; and
a displacement sensor that measures a distance between said scanning assembly and a mapping point on said specimen that is displaced from said measurement point by a fixed distance; and
a light detector that measures an intensity of light leaving said measurement point on said specimen.

2. An apparatus comprising:
a stage adapted to hold a specimen to be imaged and to move said specimen in a first direction, said stage being characterized by a stage position in said first direction;
a light source comprising a tunable laser that generates a light beam having an illumination wavelength that varies as a function of an input signal;
an imaging system comprising a scanning assembly comprising a focusing lens that focuses said light beam to a measurement point on said specimen, a first mirror that moves in a second direction relative to said stage such that said focusing lens maintains a fixed distance between said focusing lens and said stage, said second direction being different from said first direction, and a displacement sensor that measures a distance between said scanning assembly and a mapping point on said specimen; and
a light detector that measures an intensity of light leaving said measurement point on said specimen, wherein said displacement sensor does not move with said scanning assembly, said scanning assembly comprising a second mirror that moves with said scanning assembly, said second mirror reflecting a light beam from said displacement sensor onto said specimen and directing light reflected from said specimen into said displacement sensor.

3. An apparatus comprising:
a stage adapted to hold a specimen to be imaged and to move said specimen in a first direction, said stage being characterized by a stage position in said first direction;
a light source comprising a tunable laser that generates a light beam having an illumination wavelength that varies as a function of an input signal;
an imaging system comprising a scanning assembly comprising a focusing lens that focuses said light beam to a measurement point on said specimen, a first mirror that moves in a second direction relative to said stage such that said focusing lens maintains a fixed distance between said focusing lens and said stage, said second direction being different from said first direction, and a displacement sensor that measures a distance between said scanning assembly and a mapping point on said specimen; and a light detector that measures an intensity of light leaving said measurement point on said specimen, wherein said focusing lens is characterized by an in-focus distance and wherein said apparatus further comprises a controller that determines whether said measurement point on a surface of said specimen currently positioned to be measured by said light detector is in focus, said controller causing said light detector to measure said intensity of light leaving said measurement point and to record said measured intensity if said measurement point was in focus.

4. The apparatus of claim 3 wherein the measurement point is displaced relative to said mapping point such that a distance between said scanning assembly and said measurement point is available to said controller prior to said measurement point being positioned for measurement by said light detector.

5. The apparatus of claim 4 wherein said mapping point is on a separate scan line from said measurement point.

6. The apparatus of claim 3 wherein said controller alters said in-focus distance to cause a measurement point on said specimen that was not in focus, to become in focus and then measures said intensity of light leaving said measurement point on said specimen.

7. The apparatus of claim 6 wherein said focusing lens is characterized by a focal length and wherein said controller alters said focal length to change said in-focus distance.

8. The apparatus of claim 6 wherein said controller changes a distance between said focusing lens and said specimen to change said in-focus distance.

9. The apparatus of claim 6 wherein said controller causes said scanning assembly to scan said specimen in a raster scanning mode in which said scanning assembly executes scan lines in said second direction followed by changes in said stage position before or after a scan line is executed and wherein said controller does not alter said in-focus distance during a scan line.

* * * * *